United States Patent [19]

Rody

[11] 4,322,337
[45] Mar. 30, 1982

[54] POLYALKYLPIPERIDINE DERIVATIVES OF s-TRIAZINES AS STABILIZERS

[75] Inventor: Jean Rody, Riehen, Switzerland

[73] Assignee: Ciba-Geigy Corporation, Ardsley, N.Y.

[21] Appl. No.: 217,370

[22] Filed: Dec. 17, 1980

Related U.S. Application Data

[62] Division of Ser. No. 115,640, Jan. 28, 1980, Pat. No. 4,288,593.

[30] Foreign Application Priority Data

Feb. 6, 1979 [CH] Switzerland .................. 1146/79

[51] Int. Cl.$^3$ .......................... C08K 5/34; C08K 5/35
[52] U.S. Cl. .................................... 524/100; 524/101
[58] Field of Search ........................... 260/45.8 NT

[56] References Cited

U.S. PATENT DOCUMENTS

| | | | |
|---|---|---|---|
| 3,925,376 | 12/1975 | Chalmers et al. | 260/45.8 NT |
| 4,086,204 | 4/1978 | Cassandrini et al. | 260/45.8 NT |
| 4,108,829 | 8/1978 | Cassandrini et al. | 260/45.8 NT |
| 4,151,356 | 4/1979 | Evans et al. | 260/45.8 NT |
| 4,161,592 | 7/1979 | Evans et al. | 260/45.8 NT |
| 4,234,728 | 11/1980 | Rody et al. | 260/45.8 NT |
| 4,263,434 | 4/1981 | Cassandrini et al. | 260/45.8 NT |

FOREIGN PATENT DOCUMENTS 3542 8/1979 European Pat. Off. .

*Primary Examiner*—John Kight, III
*Assistant Examiner*—R. A. White
*Attorney, Agent, or Firm*—Harry Falber

[57] ABSTRACT

Novel polyalkylpiperidine derivatives of s-triazines of the formula

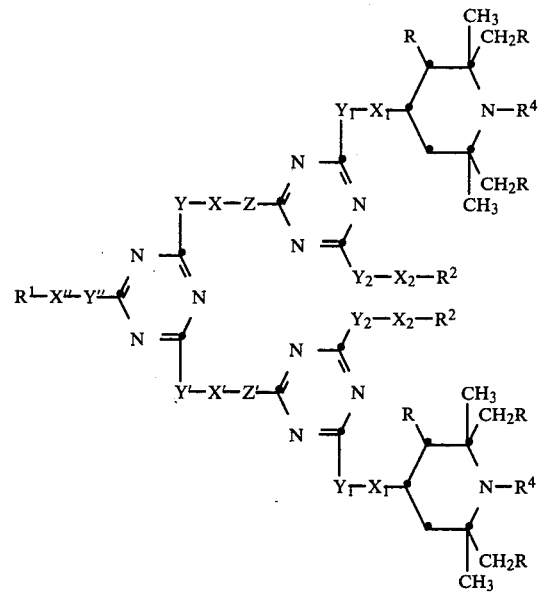

in which X and X' are a divalent organic radical, X", $X_1$ and $X_2$ are a direct bond or a divalent organic radical, Y, Y', Y", $Y_1$, $Y_2$, Z and Z' are —O—, —S—, —NH— or —NR$^3$—, R is H or CH$_3$ and R$^1$, R$^2$ and R$^3$ are a monovalent organic radical or a polyalkylpiperidine group, or the group R$^1$—X"—Y"— is chlorine, and R$^4$ is H, O, alkyl, allyl or benzyl, are valuable stabilizers for polymeric materials, in particular to protect them against photochemical degradation. The derivatives are prepared by stepwise reaction of cyanuric chloride with the corresponding YH, Y'H and Y"H compounds.

If 2 or 3 of these components are identical, the corresponding symmetrically substituted triazine compounds, which are preferred, are formed.

10 Claims, No Drawings

POLYALKYLPIPERIDINE DERIVATIVES OF s-TRIAZINES AS STABILIZERS

This is a division of application Ser. No. 115,640 filed on Jan. 28, 1980, now U.S. Pat. No. 4,288,593.

The invention relates to novel polyalkylpiperidine derivatives of s-triazines and their use as stabilisers for polymers.

These derivatives are compounds of the formula I

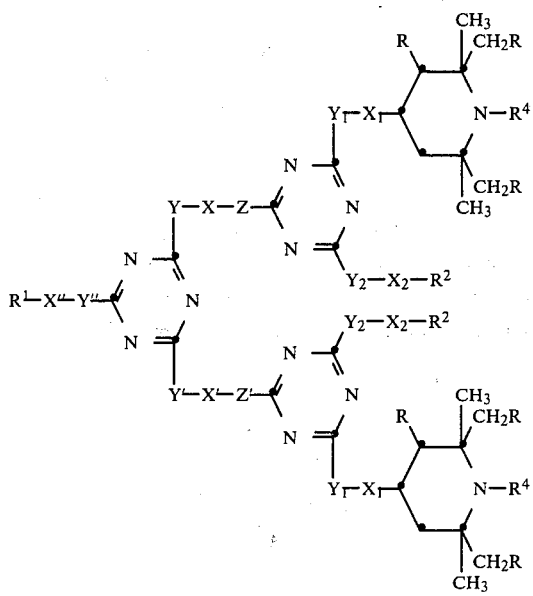

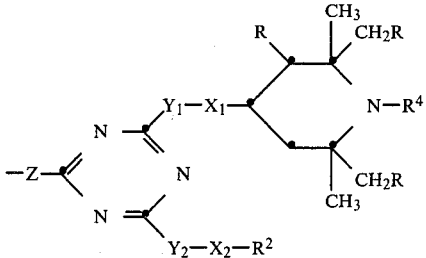

in which X and X' are $C_2$–$C_{12}$-alkylene, which can be interrupted by —O—, —S— or —$NR^3$—, or p-xylylene, X" has one of the meanings defined for X and X' or is a direct bond or a group —$OCH_2CH_2CH_2$—, the O of which is not bonded to Y", $X_1$ and $X_2$ are a direct bond, $C_1$–$C_4$-alkylene or a group —$OCH_2CH_2CH_2$—, the O of which is not bonded to $Y_1$ or $Y_2$, and $Y_1$, $Y_2$, Z and Z' are —O—, —S—, —NH— or $NR^3$—, Y, Y' and Y" are —O—, —S—, —NH—, —$NR^3$— or —$NR^5$—, R is hydrogen or methyl, $R^1$ is hydrogen, $C_1$–$C_{18}$-alkyl, $C_2$–$C_8$-alkoxyalkyl, $C_2$–$C_4$-hydroxyalkyl, $C_5$–$C_{12}$-cycloalkyl, allyl, benzyl, $C_6$–$C_{10}$-aryl or phenyl which is substituted by 1 or 2 $C_1$–$C_8$ alkyl groups and/or OH and/or $C_1$–$C_4$ alkoxy or is a polyalkylpiperidinyl group of the formula II

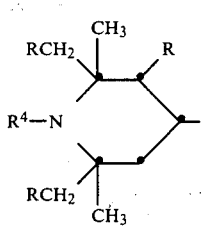

or, if Y" is —$NR^3$— and X" is a direct bond, $R^1$ and $R^3$ together with the N atom form a pyrrolidine, piperidine or morpholine ring, or $R^1$ is a radical of the formula III or the group $R^1$—X"—Y"— is chlorine, $R^2$ is $C_1$–$C_{18}$ alkyl, $C_2$–$C_8$ alkoxyalkyl, $C_2$–$C_4$ hydroxyalkyl, $C_5$–$C_{12}$ cycloalkyl, allyl, benzyl, $C_6$–$C_{10}$ aryl or phenyl which is substituted by 1 or 2 $C_1$–$C_8$ alkyl groups and/or OH and/or $C_1$–$C_4$ alkoxy or is a polyalkylpiperidinyl group of the formula II or, if $Y_2$ is —$NR^3$— and $X_2$ is a direct bond, $R^2$ and $R^3$ together with the N atom form a pyrrolidone, piperidine or morpholine ring, $R^3$ is $C_1$–$C_{18}$ alkyl, $C_2$–$C_8$ alkoxyalkyl, $C_2$–$C_4$ hydroxyalkyl, $C_5$–$C_{12}$ cycloalkyl, allyl, benzyl, $C_6$–$C_{10}$ aryl or phenyl which is substituted by 1 or 2 $C_1$–$C_8$ alkyl groups and/or OH and/or $C_1$–$C_4$ alkoxy or is a polyalkylpiperidinyl group of the formula II, $R^4$ is hydrogen, $O_o$, $C_1$–$C_{18}$-alkyl, allyl or benzyl and $R^5$ is a radical of the formula IV

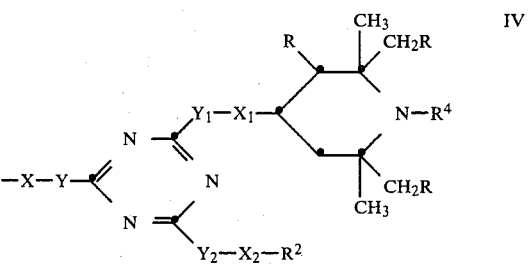

$C_1$–$C_{18}$ Alkyl $R^1$, $R^2$, $R^3$ and $R^4$ can be branched or non-branched alkyl radicals, for example methyl, ethyl, isopropyl, tert.-butyl, hexyl, isooctyl, decyl, dodecyl, tetradecyl, hexadecyl or octadecyl.

Alkoxyalkyl $R^1$, $R^2$ and $R^3$ can be, for example, methoxymethyl, 2-methoxyethyl, 2-ethoxyethyl, 2-isopropoxyethyl, 2-n-, sec.- or tert.-butoxyethyl or 2-butoxypropyl.

Hydroxyalkyl $R^1$, $R^2$ and $R^3$ can be, for example, 2-hydroxyethyl, 2-hydroxypropyl, 2-hydroxybutyl or 3-hydroxypropyl.

$C_5$–$C_{12}$ Cycloalkyl $R^1$, $R^2$ and $R^3$ can be, for example, cyclopentyl, cyclohexyl, 3-methylcyclohexyl, 4-tert.-butylcyclohexyl, cyclooctyl or cyclododecyl.

$C_6$–$C_{10}$ Aryl $R^1$, $R^2$ and $R^3$ can be phenyl or naphthyl, phenyl being preferred.

Substituted phenyl $R^1$, $R^2$ and $R^3$ can be, for example, p-tolyl, 4-hydroxyphenyl, 4-tert.-butylphenyl or 3,5-di-tert.-butyl-4-hydroxyphenyl.

$C_1$–$C_4$ Alkylene $X_1$ and $X_2$ can be, for example, methylene, ethylene, 1,3-propylene, 1,2-propylene, 1,1-dimethylethylene or 2,2-propylene.

Alkylene X, X' and X" can be a branched or non-branched alkylene group, for example ethylene, tri-, tetra-, hexa-, octa-, deca- or dodeca-methylene, 2,2-dimethyl-1,3-propylene, 1,2-butylene or 1,2-propylene.

German Offenlegungsschrift 2,319,816 already discloses simple polyalkylpiperidine derivatives of s-triazines of the formula

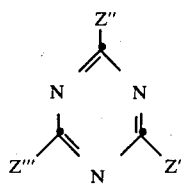

in which at least one of the substituents Z', Z" and Z'" is a polyalkylpiperidine group bonded via O, S or N to the triazine radical. These known polyalkylpiperidine derivatives of s-triazines are excellent light stabilisers for polymers. For specific applications, however, the volatility and tendency to migration of these known compounds is too great for industrial use. This is the case if the polymer is used in thin layers, for example in fibres, fibre tapes, films or lacquers, and stabilisation over a prolonged period is required. It has been found that the novel polyalkylpiperidine derivatives of s-triazines which have been defined above possess a considerably lower volatility and lesser tendency to migration, so that they have a stabilising action over a prolonged period even in polymers of low thickness.

A further advantage of the compounds of the formula I according to the invention is their low extractability. This manifests itself, for example, in the coating of textiles of stabilised synthetic fibres with synthetic latexes, in which operation the stabiliser can be extracted from the fibre. An example of this procedure is the coating of carpets on the back by the application of a synthetic latex.

Preferred compounds of the formula I are those in which R is hydrogen. These are derivatives of 2,2,6,6-tetramethylpiperidine. Compounds of the formula I in which $R^4$ is hydrogen or methyl are also preferred. Further preferred compounds of the formula I are those in which Y, Y' and Y" are —O—, —NH— or —NR$^5$— and especially those in which Y, Y' and Y" are —NH— or —NR$^5$—.

A preferred group of compounds of the formula I comprises those of the formula V

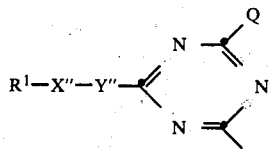

in which Q is a radical of the formula VI

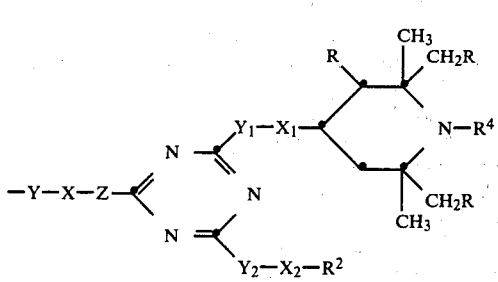

and especially those compounds of the formula V in which Q is a radical of the formula VII

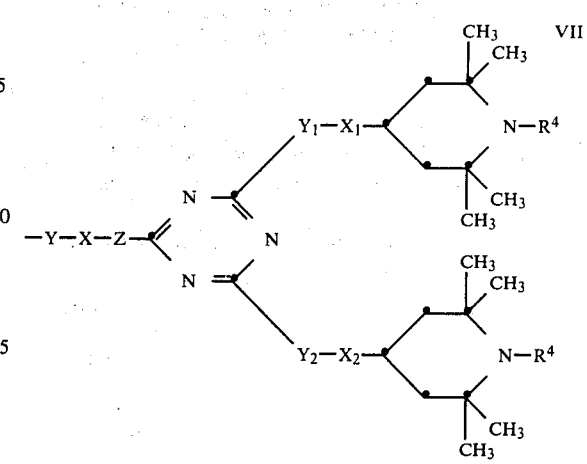

in which X is $C_2$-$C_{12}$-alkylene, $X_1$ and $X_2$ are a direct bond or $C_1$-$C_4$-alkylene, Y is —NH— or —NR$^5$—, $Y_1$ and $Y_2$ are —NH— or —NR$^3$—, Z is —NH—, $R^3$ is $C_1$-$C_{12}$-alkyl or a radical of the formula VIII

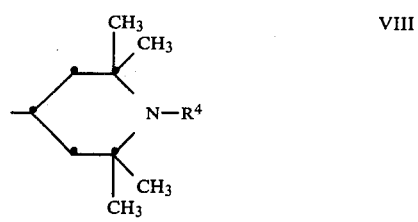

$R^4$ is hydrogen, $C_1$-$C_4$-alkyl, allyl or benzyl and $R^5$ is a radical of the formula IX

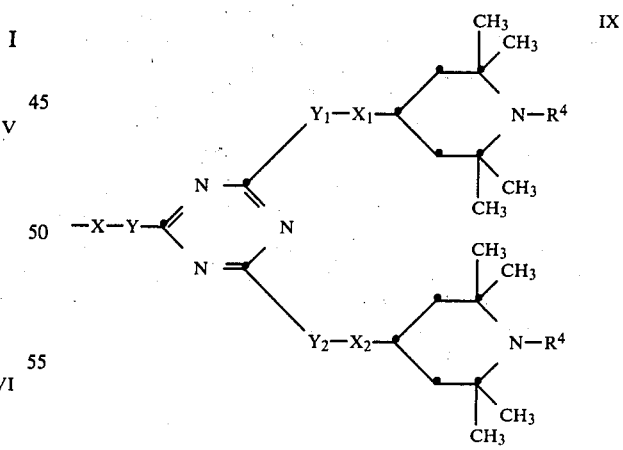

In the compounds of the formula V the radicals Q are identical and as a result of this the preparation of such compounds is simplified. The preparation of triazine compounds of the formula I having 3 identical substituents on the triazine ring is even simpler. Therefore, particularly preferred compounds are those of the general formula X

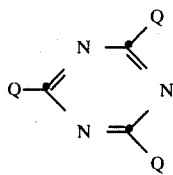

in which Q has the formula VI as defined above.

Amongst these compounds of the formula X, preferred compounds are those in which Q is a radical of the formula VII.

The compounds of the formula I are prepared by stepwise reaction of cyanuric chloride with
(a) a compound $R^1$—$X''$—$Y''H$,
(b) a compound

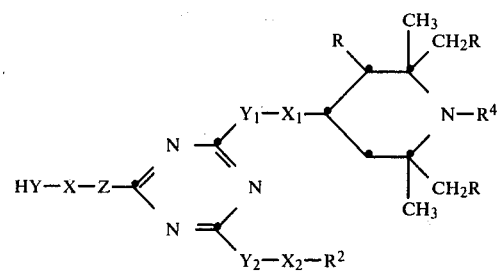

and
(c) a compound

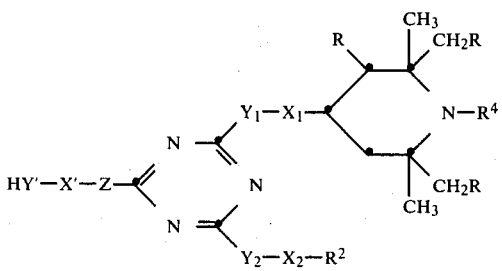

in the presence of acid-binding agents by processes which are known per se for the stepwise reaction of cyanuric chloride with hydroxy, thiol and amino compounds. The reaction is preferably carried out with the use of a solvent. Either an organic solvent, for example benzene, toluene or dioxan, can be used for this purpose or the reaction is carried out in an aqueous medium, especially in mixtures of water with a water-soluble organic solvent, for example acetone or methanol. The acid-binding agents used are inorganic or organic bases, for example NaOH, KOH, $Na_2CO_3$, MgO, triethylamine or pyridine.

The sequence of the reaction steps can also be changed by, for example, first carrying out reaction (b) and (c) and then carrying out reaction (a).

Reaction step (a) is dispensed with when preparing compounds of the formula I in which $R^1$—$X''$—$Y''$— is chlorine, i.e. cyanuric chloride is reacted only according to (b) and (c).

When preparing compounds of the formula V, step (b) is identical to step (c), so that these steps can be combined in a joint reaction step.

When preparing compounds of the formula X, steps (a), (b) and (c) are identical and can be combined in a single reaction step.

The intermediates formed after the first two stages do not need to be isolated and purified, i.e. the individual reaction stages can be carried out successively in the same reaction vessel.

The end products of the formula I are in the main solid compounds which can be purified by recrystallisation. Usually they are obtained in such high purity that they can be used without further purification as stabilisers for plastics.

The reactants required for reaction stages (b) and (c) can likewise be prepared by stepwise reaction of cyanuric chloride with hydroxy, thiol or amino compounds.

Further details with regard to the preparation can be taken from the examples.

The compounds of the formula I can be used as stabilisers for polymers; they are distinguished, in particular, by an outstanding light-stabilising action. Examples of polymers which can be stabilised by the addition of compounds of the formula I are:

1. Polymers of monoolefins and diolefins, for example polyethylene (which can be crosslinked), polypropylene, polyisobutylene, polymethylbut-1-ene, polymethylpent-1-ene, polyisoprene or polybutadiene.
2. Mixtures of the polymers mentioned under (1), for example mixtures of polypropylene with polyethylene or with polyisobutylene.
3. Copolymers of monoolefins and diolefins, for example ethylene/propylene copolymers, propylene/but-1-ene copolymers, propylene/isobutylene copolymers, ethylene/but-1-ene copolymers and terpolymers of ethylene with propylene and a diene, such as hexadiene, dicyclopentadiene or ethylidene norbornene.
4. Polystyrene.
5. Copolymers of styrene or α-methylstyrene with dienes or acrylic derivatives, for example styrene/butadiene, styrene/acrylonitrile or styrene/acrylonitrile/methyl acrylate; mixtures of high impact strength of styrene copolymers and another polymer, for example a polyacrylate, a diene polymer or an ethylene/propylene/diene terpolymer; and also block copolymers of styrene, for example styrene/butadiene/styrene, styrene/isoprene/styrene or styrene/ethylene-butylene/styrene.
6. Graft copolymers of styrene, for example styrene on polybutadiene, styrene and acrylonitrile on polybutadiene and mixtures thereof with the copolymers mentioned under (5), such as are known as so-called ABS polymers.
7. Halogen-containing polymers, for example polyvinyl chloride, polyvinylidene chloride, polyvinyl fluoride, polychloroprene, chlorinated rubbers and copolymers such as vinyl chloride/vinylidene chloride, vinyl chloride/vinyl acetate or vinylidene chloride/vinyl acetate.
8. Polymers which are derived from α,β-unsaturated acids and their derivatives, such as polyacrylates and polyacrylontrile.
9. Polymers which are derived from unsaturated alcohols and amines or their acyl derivatives or acetals, such as polyvinyl alcohol, polyvinyl acetate, polyvinyl stearate, polyvinyl benzoate, polyvinyl maleate, polyvinyl butyral, polyallyl phthalate, polyallylmelamine and their copolymers with other vinyl compounds, such as ethylene/vinyl acetate copolymers.

10. Homopolymers and copolymers of epoxides, such as polyethylene oxide, or polypropylene oxide or their copolymers with bis-glycidyl ethers.
11. Polyacetals, such as polyoxymethylene, and also those polyoxymethylenes which contain ethylene oxide as the comonomer.
12. Polyphenylene oxides.
13. Polyurethanes and polyureas.
14. Polycarbonates.
15. Polysulfones.
16. Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.
17. Polyesters which are derived from dicarboxylic acids and dialcohols and/or from hydroxycarboxylic acids or the corresponding lactones, such as polyethylene terephthalate, polybutylene terephthalate or poly-1,4-dimethylolcyclohexane terephthalate, and also block polyether-esters which are derived from polyethers with hydroxyl end groups and dicarboxylic acids.
18. Crosslinked polymers which are derived from aldehydes on the one hand and from phenols, ureas and melamines on the other hand, such as phenol/formaldehyde, urea/formaldehyde and melamine/formaldehyde resins.
19. Alkyd resins, such as glycerine/phthalic acid resins and their mixtures with melamine/formaldehyde resins.
20. Unsaturated polyester resins which are derived from copolyesters or saturated and unsaturated dicarboxylic acids with polyhydric alcohols and vinyl compounds as crosslinking agents, and also their halogen-containing modifications of low combustibility.
21. Crosslinked epoxide resins which are derived from polyepoxides, for example from bis-glycidyl ethers or from cycloaliphatic diepoxides.
22. Natural polymers, such as cellulose, rubber and their polymer-homologous, chemically modified derivatives, such as cellulose acetates, cellulose propionates and cellulose butyrates and also the cellulose ethers, such as methylcellulose.

Amongst these polymers, groups 1–7, 13 and 16 are preferred, since the stabilisers according to the invention have a particularly pronounced effect in these substrates. In addition, polymers which are used as varnish resins are of particular importance.

The stabilisers of the formula I are incorporated in the substrates in a concentration of 0.01 to 5% by weight, based on the material to be stabilised.

Preferably, 0.01 to 1.0 and particularly preferentially 0.02 to 0.5% by weight of the compounds, based on the material to be stabilised, is incorporated into the latter. Incorporation can be effected, for example, by mixing in at least one of the light stabilisers according to the invention and, if desired, further additives by the methods customary in industry, before or during shaping, or by applying the dissolved or dispersed compounds to the polymer, with subsequent evaporation of the solvent if necessary.

The polymer stabilised in this way can also contain yet further stabilisers or other additives customary in plastics technology, such as are listed, for example, in German Offenlegungsschrift 2,349,962, pages 25–32. This relates in particular to the addition of plasticisers, lubricants, pigments, fillers, reinforcing materials, flameproofing agents, antistatic agents, light stabilisers, antioxidants or metal deactivators.

When known stabilisers are also used, synergistic effects can arise and this is frequently the case especially when other light stabilisers or organic phosphites are additionally used.

The additional use of antioxidants when stabilising polyolefins is of particular importance.

The invention therefore also relates to the polymers which are stabilised by the addition of 0.01 to 5% by weight of a compound of the formula I and which, if desired, can contain yet further known and conventional additives. The polymers stabilised in this way can be used in very diverse forms, for example in the form of films, fibres, tapes or profiles or as binders for lacquers, adhesives or putties.

Use in thin layers, such as in the form of fibres, films and lacquers, is of particular importance.

The preparation and use of the compounds according to the invention is described in more detail in the following examples. Parts and percentages are by weight. The temperatures are given in degrees centigrade.

EXAMPLE 1

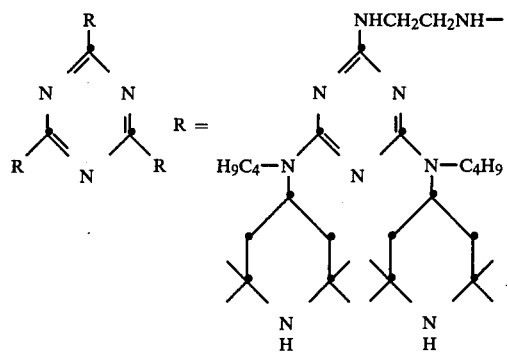

53.6 g of 2-chloro-4,6-bis-(2,2,6,6-tetramethyl-4-piperidyl-butylamino)-1,3,5-triazine in 200 ml of ethylenediamine are refluxed for 24 hours. 200 ml of toluene and 100 ml of 30% sodium hydroxide solution are added to the reaction mixture and the resulting mixture is stirred vigorously for 30 minutes. The aqueous solution is separated off and the toluene solution is washed with twice 200 ml of water, dried over sodium sulfate and evaporated. The 2-(2-aminoethylamino)-4,6-bis-(2,2,6,6-tetramethyl-4-piperidyl-butylamino)-1,3,5-triazine thus obtained is dissolved in 200 ml of xylene and the resulting solution is cooled to 5°. 6.1 g of cyanuric chloride are introduced at this temperature and the reaction mixture is stirred at 5°–10° for 1 hour. After adding 1.4 g of finely powdered sodium hydroxide, the temperature is raised to 35°–40° and the mixture is stirred for 2 hours at this temperature. After adding a fresh portion of 1.4 g of sodium hydroxide, the mixture is heated slowly to the reflux temperature. After refluxing for 3 hours, a final portion of 1.4 g of sodium hydroxide is added and the reaction mixture is then stirred under reflux for 18 hours. After cooling, 200 ml of water are added, the mixture is stirred well for 10 minutes, the aqueous solution is separated off and the xylene solution is washed with 3 times 100 ml of water. The xylene solution is evaporated in vacuo and the residue is then dried under a high vacuum (130°/0.001 mm Hg). The resulting glassy, yellowish mass can be comminuted to a

EXAMPLE 2

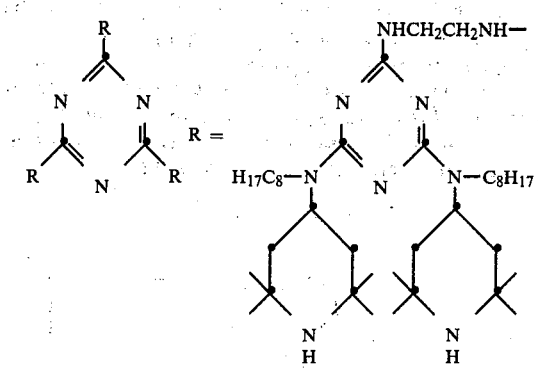

63.6 g of 2-chloro-4,6-bis-(2,2,6,6-tetramethyl-4-piperidyl-octylamino)-1,3,5-triazine are used in place of 53.6 g of 2-chloro-4,6-bis-(2,2,6,6-tetramethyl-4-piperidylbutylamino)-1,3,5-triazine and in other respects the procedure of Example 1 is repeated. The compound with the above structure is obtained in the form of a virtually colourless powder with a melting point of 82°-83°.

EXAMPLE 3

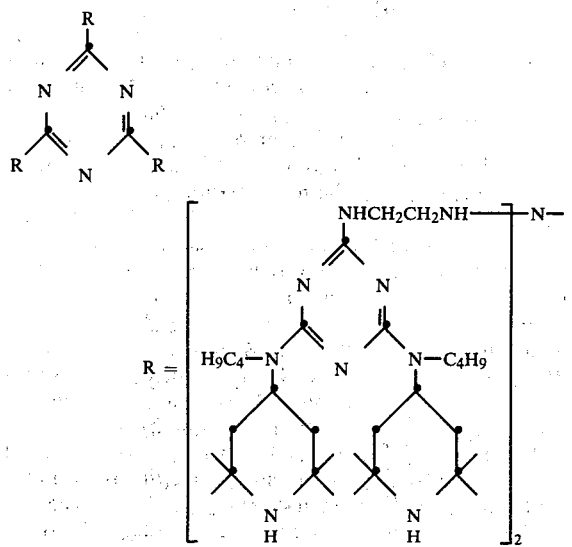

107.2 g of 2-chloro-4,6-bis-(2,2,6,6-tetramethyl-4-piperidyl-butylamino)-1,3,5-triazine and 10.3 g of diethylenetriamine in 300 ml of xylene are refluxed for 12 hours. After adding 8.8 g of finely powdered sodium hydroxide, the mixture is stirred under reflux for a further 24 hours and cooled to below 100°, 200 ml of water are added, the resulting mixture is stirred for 10 minutes and the aqueous phase is then separated off. The xylene solution is washed with 3 times 100 ml of water. In order to effect complete dehydration of the xylene solution, about 20 ml of solvent are distilled off and the solution is then diluted with 120 ml of dry xylene and cooled to 5°-10°. After adding 6.1 g of cyanuric chloride, the mixture is stirred for 2 hours at room temperature and 1.4 g of sodium hydroxide are then added and the resulting mixture is stirred for 2 hours at 40°-45°. After a further addition of 1.4 g of sodium hydroxide, the mixture is heated slowly to the reflux temperature and stirred under reflux for 4 hours, a final portion of 1.4 g of sodium hydroxide is added and the resulting mixture is refluxed for a further 24 hours. 200 ml of water are added to the reaction mixture, the resulting mixture is stirred for 10 minutes and the aqueous phase is then separated off. The xylene solution is washed with 3 times 100 ml of water and evaporated in vacuo.

The residue is dried at 130°-40°/0.005 mm Hg. The product having the above structural formula is obtained in the form of a yellowish, brittle mass which can easily be pulverised to give a powder with a melting point of about 140°.

EXAMPLE 4

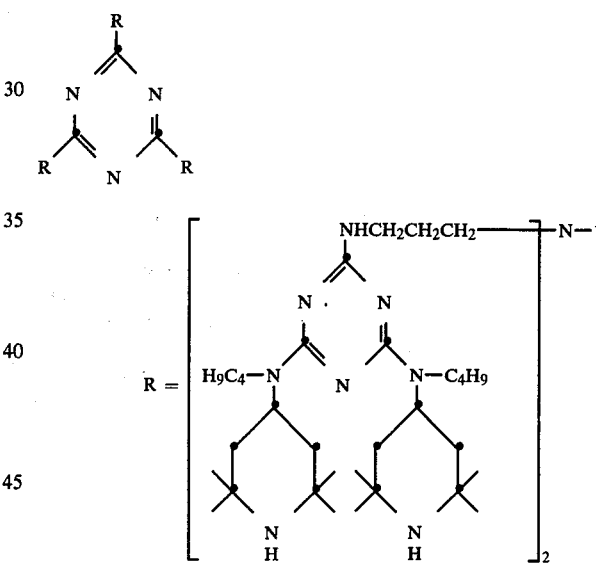

13.1 g of dipropylenetriamine are used in place of 10.3 g of diethylenetriamine and in other respects the procedure of Example 3 is repeated. The compound having the above structure is obtained in the form of a colourless powder with a melting point of about 120°.

EXAMPLE 5

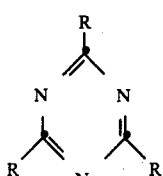

-continued

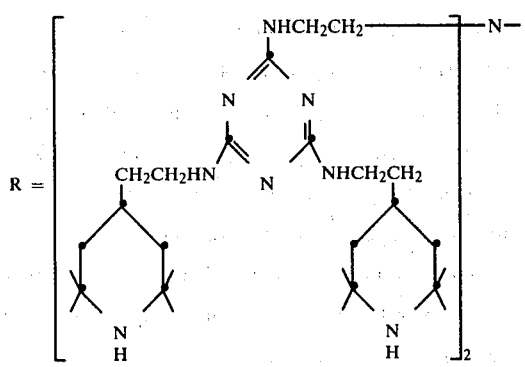

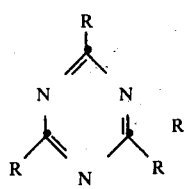

96.0 g of 2-chloro-4,6-bis-[2-(2,2,6,6-tetramethyl-4-piperidyl)-ethylamino]-1,3,5-triazine are used in place of 107.2 g of 2-chloro-4,6-bis-(2,2,6,6-tetramethyl-4-piperidyl-butylamino)-1,3,5-triazine and in other respects the procedure of Example 3 is repeated. The compound having the above structure is obtained in the form of a pale yellow powder with a melting point of about 100°.

EXAMPLE 6

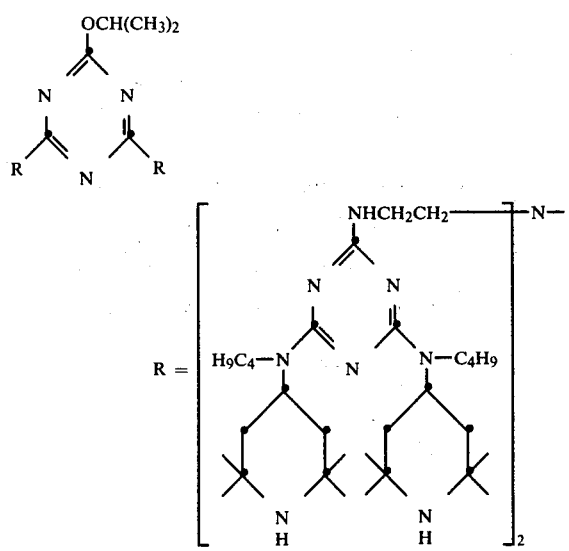

53.6 g of 2-chloro-4,6-bis-(2,2,6,6-tetramethyl-4-piperidyl-butylamino)-1,3,5-triazine are reacted in the manner described in Example 2 with 5.2 g of diethylenetriamine. 5.2 g of 2,4-dichloro-6-isopropoxy-1,3,5-triazine are added, at room temperature, to the dehydrated xylene solution of the resulting intermediate and the mixture is then stirred at 50° for 2 hours. After adding 1.0 g of finely powdered sodium hydroxide, the mixture is refluxed for 12 hours, 1.1 g of sodium hydroxide are added and the mixture is refluxed for a further 36 hours. After working up as in Example 2, the product of the above formula is obtained in the form of a colourless powder with a melting point of about 120°.

EXAMPLE 7

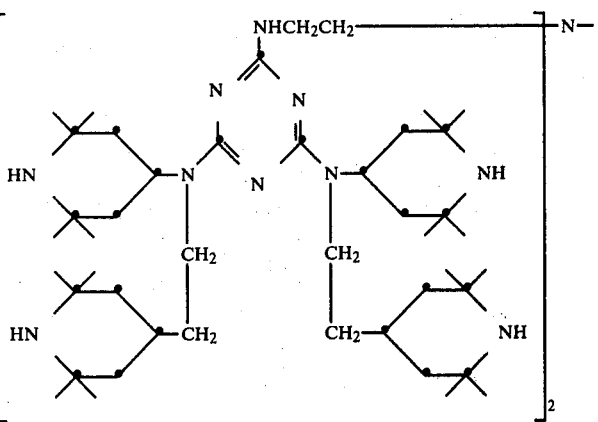

36.9 g of cyanuric chloride are dissolved in 250 ml of acetone and the solution is cooled to 5°. A solution of 129.4 g of 2,2,6,6-tetramethyl-4-[2-(2,2,6,6-tetramethylpiperidyl-4)-aminoethyl]-piperidine in 500 ml of water is added dropwise to this solution, at 5°–10°, in the course of about 2 hours and the resulting mixture is allowed to react further for 30 minutes. A solution of 8.0 g of sodium hydroxide in 50 ml of water is then added dropwise in the course of about 5 minutes and the resulting mixture is stirred for a further 2 hours at 35°–40°. A solution of 8.0 g of sodium hydroxide in 50 ml of water is again added dropwise and the resulting mixture is then stirred for 6 hours at 45°–50°. The colourless precipitate of 2-chloro-4,6-bis-[2,2,6,6-tetramethyl-4-piperidyl-2-(2,2,6,6-tetramethylpiperidyl-4)-ethylamino]-1,3,5-triazine is filtered off, washed with water, dried and recrystallised from acetonitrile (melting point 142°). 45.5 g of this compound and 3.0 g of diethylenetriamine in 200 ml of xylene are refluxed for 12 hours. After adding 2.5 g of finely powdered sodium hydroxide, the mixture is stirred under reflux for a further 24 hours. The reaction mixture is cooled to about 10° and 1.84 g of cyanuric chloride are introduced. The resulting mixture is stirred at room temperature for 2 hours and then at 45°–50° for 4 hours, 1.3 g of sodium hydroxide are added and the resulting mixture is then refluxed for 24 hours. After cooling, 200 ml of water are added to the reaction mixture, the resulting mixture is stirred vigorously for 10 minutes and the aqueous phase is separated off. The xylene solution is washed with 3 times 100 ml of water and then evaporated in vacuo. The resulting residue is dried for 15 hours at 130°/0.001 mm Hg and then powdered. The product of the above formula is obtained in the form of a virtually colourless powder with a melting point of about 130°.

EXAMPLE 8

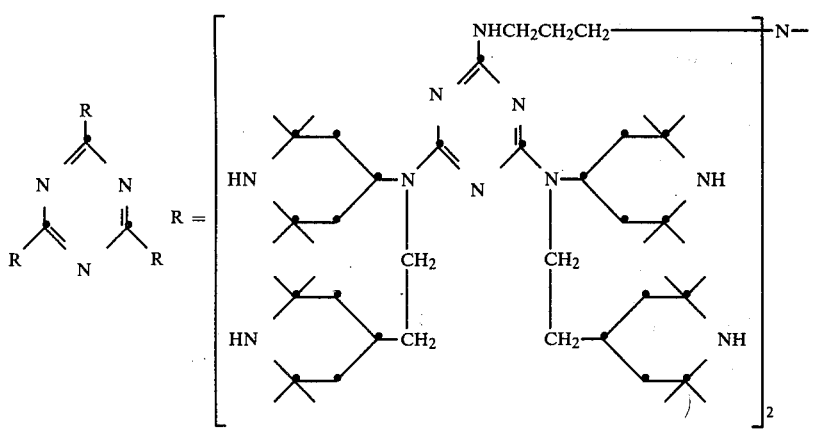

3.9 g of dipropylenediamine are used in place of 3.0 g of diethylenetriamine and in other respects the procedure of Example 7 is repeated. The compound having the above structure is obtained in the form of a virtually colourless powder with a melting point of about 136°.

EXAMPLE 9

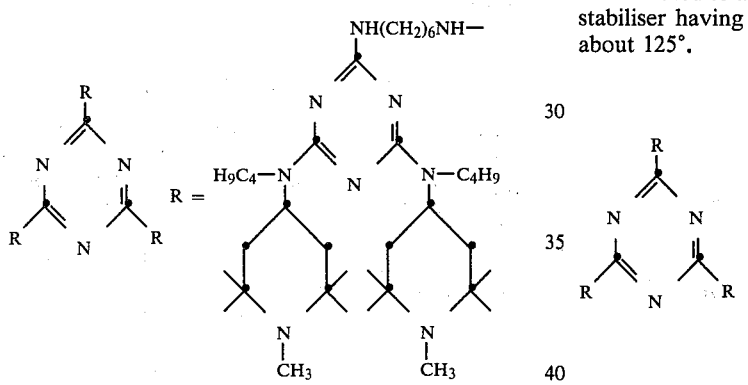

56.4 g of 2-chloro-4,6-bis-(1,2,2,6,6-pentamethyl-4-piperidyl-butylamino)-1,3,5-triazine are introduced into a melt of 120 g of hexamethylenediamine at 80°. The reaction mixture is then stirred for 8 hours at 100° and after adding 50 ml of xylene is then stirred for 16 hours at 140°. The reaction mixture is diluted with 200 ml of xylene, a solution of 4.4 g of sodium hydroxide in 50 ml of water is added and the resulting mixture is stirred vigorously for 4 hours at room temperature. The xylene solution is separated off from the aqueous phase in a separating funnel, dried over sodium sulphate and evaporated in vacuo. 57.9 g of the 2-(6-aminohexylamino)-4,6-bis-(1,2,2,6,6-pentamethyl-4-piperidyl-butylamino)-1,3,5-triazine thus obtained are dissolved in 200 ml of xylene and the resulting solution is cooled to 5°. 5.5 g of cyanuric chloride are introduced at this temperature and the reaction mixture is stirred at 5°-10° for 1 hour. After adding 1.2 g of finely powdered sodium hydroxide, the temperature is raised to 35°-40° and the mixture is stirred for 2 hours at this temperature. After adding a further portion of 1.2 g of sodium hydroxide, the reaction mixture is slowly heated to the reflux temperature. After 3 hours under reflux, a final portion of 1.4 g of sodium hydroxide is added and the reaction mixture is then stirred under reflux for 16 hours. After cooling, 200 ml of water are added, the mixture is stirred well for 15 minutes, the aqueous solution is separated off and the xylene solution is washed with 3 times 100 ml of water. The xylene solution is evaporated in vacuo and the residue is then dried under a high vacuum (130°/0.001 mm Hg). The resulting, pale yellowish mass can be comminuted to a virtually colourless powder. The light stabiliser having the above structural formula melts at about 125°.

EXAMPLE 10

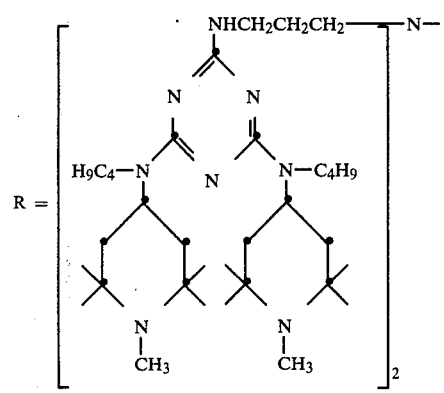

90.2 g of 2-chloro-4,6-bis-(1,2,2,6,6-pentamethyl-4-piperidyl-butylamino)-1,3,5-triazine and 10.4 g of dipropylenetriamine in 250 ml of xylene are refluxed for 8 hours. After adding 8.0 g of finely powdered sodium hydroxide, the reaction mixture is stirred for a further 16 hours under reflux and cooled to below 100°, 200 ml of water are added, the resulting mixture is stirred for 15 minutes and the aqueous phase is then separated off. The xylene solution is washed with 3 times 100 ml of water and then evaporated in vacuo. 71.4 g of the resinous intermediate thus obtained are dissolved in 300 ml of xylene and the resulting solution is cooled to 5°-10°. After adding 3.6 g of cyanuric chloride, the mixture is stirred for 2 hours at 10°-15°, 0.8 g of sodium hydroxide is added and the resulting mixture is stirred for 3 hours at 45°–50°. After a further addition of 0.8 g of sodium hydroxide, the reaction mixture is slowly heated to the reflux temperature and stirred under reflux for 6 hours, a final portion of 1.0 g of sodium hydroxide is added and the resulting mixture is stirred for a further 18 hours under reflux. 200 ml of water are added to the reaction mixture, the whole is stirred well for 15 minutes and the aqueous phase is then separated off. The xylene solution is washed with 3 times 100 ml of water and evaporated in vacuo. The residue is dried at 130°–40°/0.005 mm Hg. The product having the above structural formula is obtained in the form of a yellowish mass which can be pulverised easily when cold to give a powder with a melting point of about 145°.

EXAMPLE 11

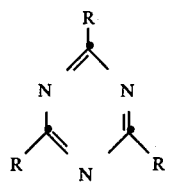

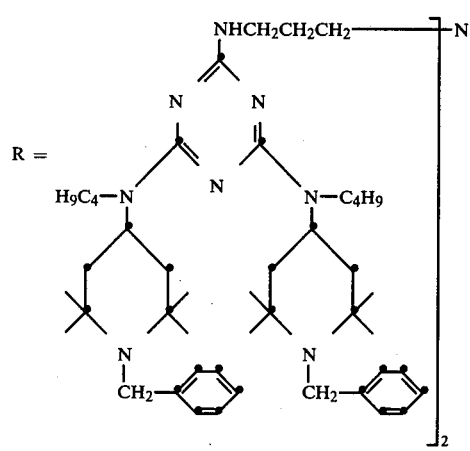

114.0 g of 2-chloro-4,6-bis-(1-benzyl-2,2,6,6-tetramethyl-4-piperidyl-butylamino)-1,3,5-triazine are used in place of 90.2 g of 2-chloro-4,6-bis-(1,2,2,6,6-pentamethyl-4-piperidyl-butylamino)-1,3,5-triazine and in other respects the procedure of Example 10 is repeated. The compound having the above structure is obtained in the form of a pale yellowish powder with a melting point of about 108°.

EXAMPLE 12

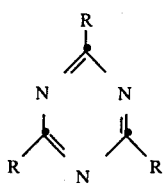

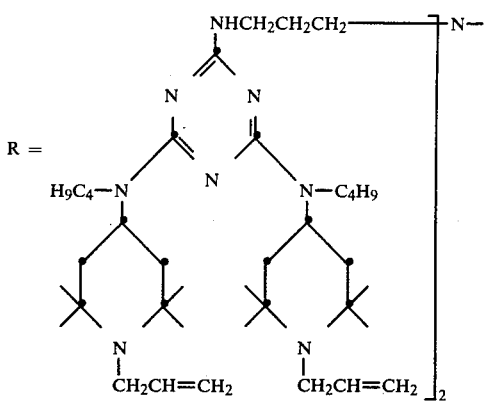

98.6 g of 2-chloro-4,6-bis-(1-allyl-2,2,6,6-tetramethyl-4-piperidyl-butylamino)-1,3,5-triazine are used in place of 90.2 g of 2-chloro-4,6-bis-(1,2,2,6,6-pentamethyl-4-piperidyl-butylamino)-1,3,5-triazine and in other respects the procedure of Example 10 is repeated. The compound having the above structure is obtained in the form of a yellowish powder with a melting point of about 95°.

EXAMPLE 13

Stabilisation of polypropylene against light 100 parts of polypropylene powder (Moplen, fibre grade, from Montedison) are homogenised with 0.2 part of octadecyl β-(3,5-di-tert.-butyl-4-hydroxyphenyl)-propionate and 0.25 part of a stabiliser from the following Table 1 for 10 minutes in a Brabender plastograph at 200° C. The composition which is thus obtained is removed from the kneader as rapidly as possible and pressed in a toggle press to give a 2–3 mm thick sheet. Part of the resulting pressed blank is cut out and pressed between two high-gloss hard aluminium foils for 6 minutes at 260°, using a manual hydraulic laboratory press, to give a 0.1 mm thick film, which is immediately plunged into cold water. Cut pieces are now punched from this film and exposed in a Xenotest 1200. These test pieces are removed from the exposure apparatus at regular intervals and their carbonyl content is tested in a IR spectrophotometer. The increase in the carbonyl extinction at 5.85μ on exposure is a measure of the photo-oxidative degradation of the polymer (cf. L. Balaban et al., J. Polymer Sci., Part C, 22, 1059–1071 (1969)) and, according to experience, is associated with a deterioration in the mechanical properties of the polymer. The time which is taken to reach a carbonyl extinction of about 0.3, at which the comparison film is brittle, is taken as a measure of the protective effect.

The protective effect of the stabilisers according to the invention can be seen from Table 1 below:

TABLE 1

| Light stabiliser | Hours in the Xenotest 1200 before the carbonyl extinction is 0.3 |
|---|---|
| Comparison, without light stabilizer | 800 |
| Product of Example 1 | 4,660 |
| Product of Example 3 | 4,290 |
| Product of Example 4 | 4,350 |
| Product of Example 5 | >3,500 |

TABLE 1-continued

| Light stabiliser | Hours in the Xenotest 1200 before the carbonyl extinction is 0.3 |
|---|---|
| Product of Example 6 | 4,350 |
| Product of Example 7 | 4,090 |
| Product of Example 8 | >3,500 |

EXAMPLE 14

Light stabilising action in polypropylene fibres 1,000 parts of polypropylene powder (melt index ~18) which has not been stabilised are mixed in a high-speed mixer with 1 part of calcium stearate, 0.5 part of calcium bis-(4'-hydroxy-3',5'-di-tertiary butyl-benzylethylphosphonate), 2.5 parts of titanium dioxide and 3 parts of the light stabilisers listed in the table and the mixture is then extruded in an extruder at 220° C. and granulated. The resulting granules are spun in a laboratory melt-spinning installation at a maximum temperature of 270° C. and a speed of 600 m/minute to give a 403/37 denier multifilament. This is drawn and twisted using a draw-twister. The drawing ratio is 1:3.2, so that ultimately multifilaments of 130/37 denier are obtained. These multifilaments are mounted on white card, a further strip of card being attached at each end of the card, so that the filaments in the central part are stretched over 5 cm without contact. The contact-free section of half of the samples is coated over a distance of 1 cm with Acryllatex Primal® HA 24 (Röhm and Haas). The samples are dried for 20 minutes at 120° C. and exposed in a Xenotest 1200.

Table 2 gives the exposure time which elapses before there is a 50% loss in the tear strength, as a measure of the protective effect. For comparison with the prior art, analogous monotriazine compounds from German Offenlegungsschrift 2,319,816 are used. The comparatively low degree of stabilisation is in particular due to the fact that the monotriazine compounds have been extracted from the fibre by the latex and during drying migrate from the fibre into the coating composition.

TABLE 2

| Light stabiliser (0.3% in each case) | Exposure time in the Xenotest 1200 which elapses before the elongation at break is reduced by 50% |
|---|---|
| none | 440 hours |
| Product of Example 1 | 2,900 hours |
| Product of Example 3 | 3,200 hours |
| Product of Example 7 | 3,100 hours |
| Comparison products from German Offenlegungsschrift 2,319,816: | |

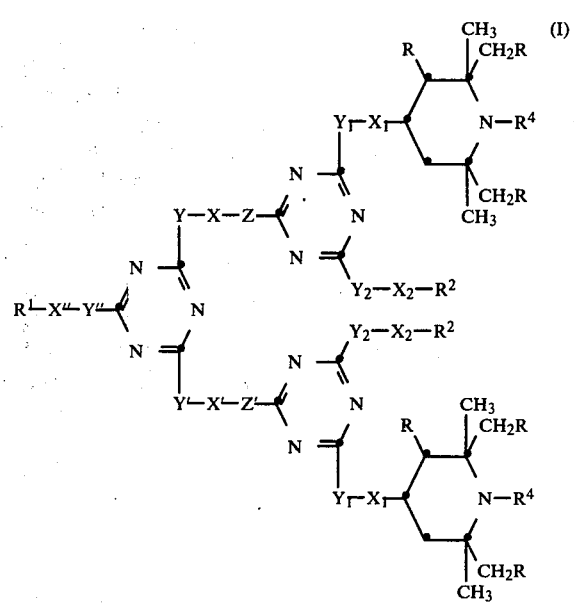

TABLE 2-continued

| Light stabiliser (0.3% in each case) | Exposure time in the Xenotest 1200 which elapses before the elongation at break is reduced by 50% |
|---|---|
| (R with C4H9, NH) | 1,700 hours |
| (R with C8C17, NH) | 1,900 hours |
| (R with C4H9, N—CH2CH=CH2) | 700 hours |

What is claimed is:

1. A polymer composition stabilized against the action of light, which contains 0.01 to 5% by weight of at least one compound of the formula I

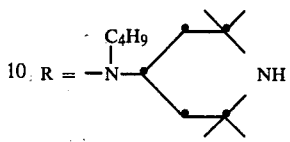

in which X and X' are $C_2$–$C_{12}$-alkylene, which can be interrupted by —O—, —S— or —NR$^3$—, or p-xylylene, X" has one of the meanings defined for X and X' or is a direct bond or a group —OCH$_2$CH$_2$CH$_2$—, the O of which is not bonded to Y''', $X_1$ and $X_2$ are a direct bond, $C_1$–$C_4$-alkylene or a group —OCH$_2$CH$_2$CH$_2$—, the O of which is not bonded to $Y_1$ or $Y_2$, and $Y_1$, $Y_2$, Z and Z' are —O—, —S—, —NH— or —NR$^3$—, Y, Y' and Y" are —O—, —S—, —NH—, —NR$^3$— or —NR$^5$—, R is hydrogen or methyl, R$^1$ is hydrogen, $C_1$–$C_{18}$-alkyl, $C_2$–$C_8$-alkoxyalkyl, $C_2$–$C_4$-hydroxyalkyl, $C_5$–$C_{12}$-cycloalkyl, allyl, benzyl, $C_6$–$C_{10}$-aryl or phenyl which is substituted by 1 or 2 $C_1$–$C_8$ alkyl groups or OH or $C_1$-$C_4$-alkoxy or is a polyalkylpiperidinyl group of the formula II

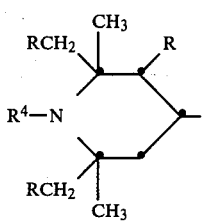
(II)

or, if Y" is —NR$^3$— and X" is a direct bond, R$^1$ and R$^3$ together with the N atom form a pyrrolidine, piperidine or morpholine ring, or R$^1$ is a radical of the formula III

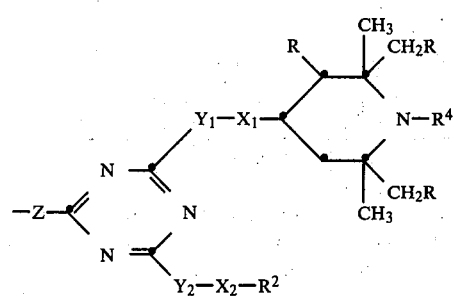
(III)

or the group R$^1$—X"—Y"— is chlorine, R$^2$ is $C_1$-$C_{18}$ alkyl, $C_2$-$C_8$ alkoxyalkyl, $C_2$-$C_4$ hydroxyalkyl, $C_5$-$C_{12}$ cycloalkyl, allyl, benzyl, $C_6$-$C_{10}$ aryl or phenyl which is substituted by 1 or 2 $C_1$-$C_8$ alkyl groups or OH or $C_1$-$C_4$ alkoxy or is a polyalkylpiperidinyl group of the formula II or, if Y$_2$ is —NR$^3$— and X$_2$ is a direct bond, R$^2$ and R$^3$ together with the N atom form a pyrrolidine, piperidine or morpholine ring, R$^3$ is $C_1$-$C_{18}$ alkyl, $C_2$-$C_8$ alkoxyalkyl, $C_2$-$C_4$ hydroxyalkyl, $C_5$-$C_{12}$ cycloalkyl, allyl, benzyl, $C_6$-$C_{10}$ aryl or phenyl which is substituted by 1 or 2 $C_1$-$C_8$ alkyl groups OH or $C_1$-$C_4$ alkoxy or is a polyalkylpiperidinyl group of the formula II, R$^4$ is hydrogen, Oo, $C_1$-$C_{18}$-alkyl, allyl or benzyl and R$^5$ is a radical of the formula IV

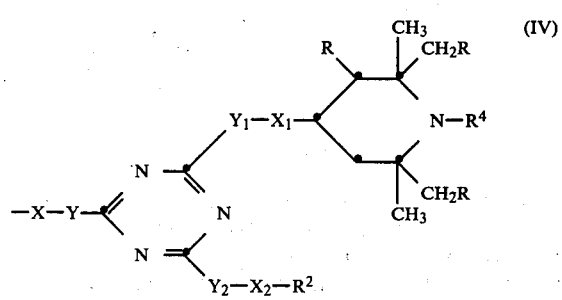
(IV)

2. The composition of claim 1, wherein R is hydrogen in the compound of formula I.

3. The composition of claim 1, wherein R$^4$ is hydrogen or methyl in the compound of formula I.

4. The composition of claim 1, wherein Y, Y' and Y" are —O—, —NH— or —NR$^5$—.

5. The composition of claim 1, wherein said compound corresponds to the formula

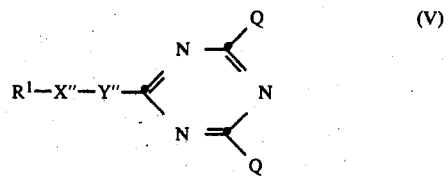
(V)

in which Q is a radical of the formula VI

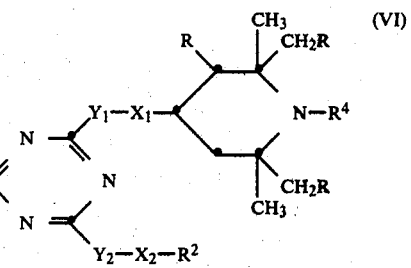
(VI)

and R$^1$, R$^2$, Z, X", Y", Y, X, Y$^1$, X$^1$, Y$^2$, X$^2$, R and R$^4$ are as defined in claim 1.

6. A composition of claim 5, wherein Q is a group of the formula VII (VII)

in which X is $C_2$-$C_{12}$-alkylene, X$_1$ and X$_2$ are a direct bond or $C_1$-$C_4$-alkylene, Y is —NH— or —NR$^5$—, Y$_1$ and Y$_2$ are —NH— or —NR$^3$—, Z is —NH—, R$^3$ is $C_1$-$C_{12}$-alkyl or a radical of the formula VIII

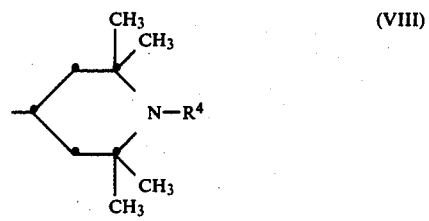
(VIII)

R$^4$ is hydrogen, $C_1$-$C_4$-alkyl, allyl or benzyl and R$^5$ is a radical of the formula IX 7. The composition of claim 1, wherein said compound corresponds to the formula X

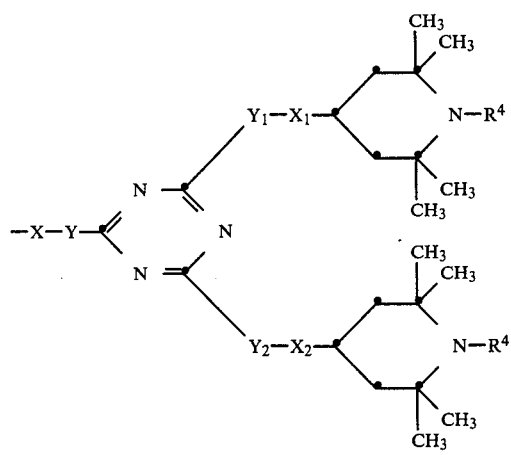

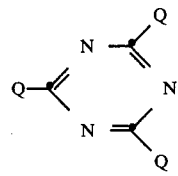

in which Q is a radical of the formula VI

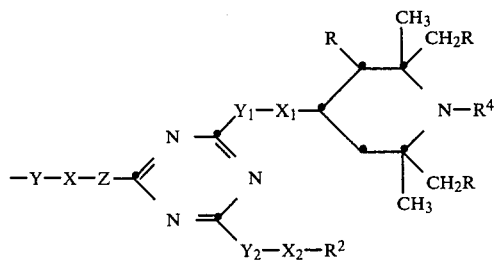

and $R^2$, Z, Y, X, $Y^1$, $X^1$, $Y^2$, $X^2$, R and $R^4$ are as defined in claim 1.

8. The composition of claim 7, wherein Q is a group of the formula VII

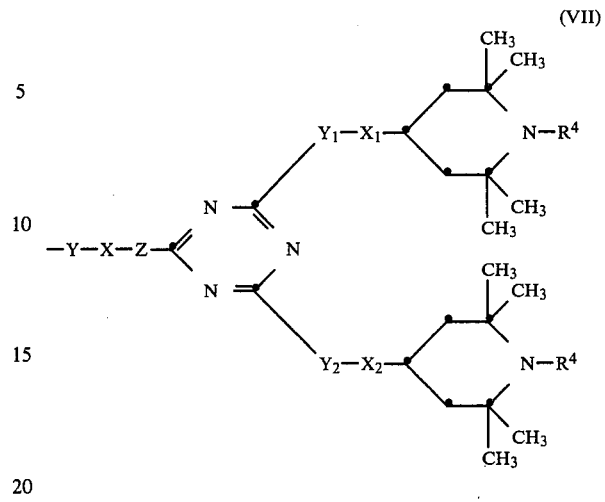

in which X is $C_2-C_{12}$-alkylene, $X_1$ and $X_2$ are a direct bond or $C_1-C_4$-alkylene, Y is —NH— or —$NR^5$—, $Y_1$ and $Y_2$ are —NH— or —$NR^3$—, Z is —NH—, $R^3$ is $C_1-C_{12}$-alkyl or a radical of the formula VIII

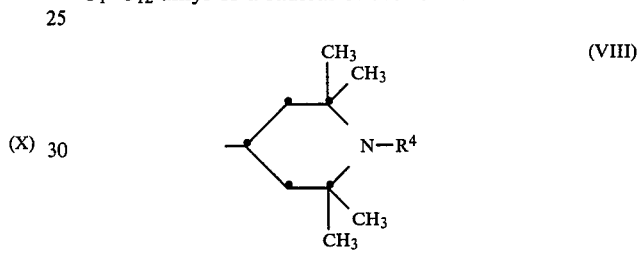

$R^4$ is hydrogen, $C_1-C_4$-alkyl, allyl or benzyl and $R^5$ is a radical of the formula IX

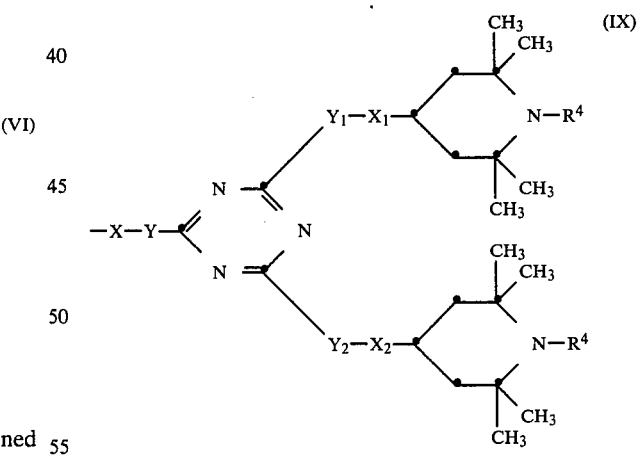

9. A polymer composition according to claim 1, wherein the polymer is a polyolefin.

10. A polymer composition according to claim 1, wherein the polymer is a binder for a lacquer.

* * * * *